United States Patent
Fukushima

(10) Patent No.: US 11,996,766 B2
(45) Date of Patent: May 28, 2024

(54) POWER SUPPLY DEVICE

(71) Applicant: Rohm Co., Ltd., Kyoto (JP)

(72) Inventor: Shun Fukushima, Kyoto (JP)

(73) Assignee: Rohm Co., Ltd., Kyoto (JP)

( * ) Notice: Subject to any disclaimer, the term of this patent is extended or adjusted under 35 U.S.C. 154(b) by 255 days.

(21) Appl. No.: 17/641,558

(22) PCT Filed: Aug. 19, 2020

(86) PCT No.: PCT/JP2020/031286
§ 371 (c)(1),
(2) Date: Mar. 9, 2022

(87) PCT Pub. No.: WO2021/054027
PCT Pub. Date: Mar. 25, 2021

(65) Prior Publication Data
US 2022/0302822 A1     Sep. 22, 2022

(30) Foreign Application Priority Data

Sep. 19, 2019    (JP) .................................. 2019170257

(51) Int. Cl.
*H02M 1/32*    (2007.01)
*G05F 1/56*    (2006.01)
*H02M 3/158*    (2006.01)

(52) U.S. Cl.
CPC ................ *H02M 1/32* (2013.01); *G05F 1/56* (2013.01); *H02M 3/158* (2013.01)

(58) Field of Classification Search
CPC ......... H02M 1/32; H02M 3/156; H02M 3/158
See application file for complete search history.

(56) References Cited

U.S. PATENT DOCUMENTS

| 8,913,363 | B2 * | 12/2014 | Takata | H02M 1/32 |
| | | | | 323/282 |
| 2014/0192449 | A1 * | 7/2014 | Shimizu | H02M 1/36 |
| | | | | 361/93.1 |
| 2015/0069988 | A1 * | 3/2015 | Miura | H02M 1/32 |
| | | | | 323/282 |

(Continued)

FOREIGN PATENT DOCUMENTS

| JP | H1-0295671 | 11/1998 |
| JP | 2010-226819 | 10/2010 |

(Continued)

OTHER PUBLICATIONS

International Search Report in International Appln. No. PCT/JP2020/031286, dated Oct. 20, 2022, 4 pages.

*Primary Examiner* — Alex Torres-Rivera
(74) *Attorney, Agent, or Firm* — Fish & Richardson P.C.

(57) ABSTRACT

A power supply device includes an output transistor provided in series between an input terminal via which to receive an input voltage and an output terminal via which to deliver an output voltage, and is configured to generate the output voltage by bucking the input voltage through control of the state of the output transistor. The power supply device includes a short circuit protection circuit configured to perform short circuit protection operation by keeping off the output transistor based on the output voltage, and a masking circuit configured to be able to mask the short circuit protection operation based on the input voltage and the output voltage.

10 Claims, 9 Drawing Sheets

(56) References Cited

U.S. PATENT DOCUMENTS

| | | | |
|---|---|---|---|
| 2016/0373002 A1* | 12/2016 | Borfigat | H02M 1/32 |
| 2017/0187289 A1* | 6/2017 | Fukumoto | H02M 1/32 |
| 2018/0175607 A1* | 6/2018 | Kuwano | H02M 1/32 |
| 2018/0278045 A1 | 9/2018 | Watanabe | |

FOREIGN PATENT DOCUMENTS

| | | |
|---|---|---|
| JP | 2011-167013 | 8/2011 |
| JP | 2018-164394 | 10/2018 |

* cited by examiner

| SC_DET | SCP_MASK | |
|--------|----------|---|
| Lo | Lo | REGULAR OPERATION (SWITCHING OPERATION PERFORMED) |
| Hi | Lo | SHORT CIRCUIT PROTECTION OPERATION (SWITCHING OPERATION SUSPENDED) |
| Lo/Hi | Hi | REGULAR OPERATION (SHORT CIRCUIT PROTECTION OPERATION MASKED) |

1ST REFERENCE OPERATION

2ND REFERENCE OPERATION

[EX1_1]

3RD OPERATION EXAMPLE
(DROP IN Vin FOLLOWED BY OUTPUT SHORT CIRCUIT)

[EX1_2]

| SC_DET | SCP_MASK | |
|---|---|---|
| Lo | Lo | REGULAR OPERATION |
| Hi | Lo | SHORT CIRCUIT PROTECTION OPERATION (OUTPUT TRANSISTOR OFF) |
| Lo/Hi | Hi | REGULAR OPERATION (SHORT CIRCUIT PROTECTION OPERATION MASKED) |

POWER SUPPLY DEVICE

TECHNICAL FIELD

The present disclosure relates to power supply devices.

BACKGROUND ART

In a switching power supply device (DC-DC converter) that generates an output voltage by bucking (stepping down) an input voltage, an output transistor is made to perform switching based on a feedback voltage commensurate with the output voltage, and thereby the output voltage is stabilized at a predetermined target voltage.

Switching power supply devices are often provided with a short circuit protection function. In a switching power supply device with a short circuit protection function, when the output voltage is abnormally low, an output short circuit is assumed to be occurring, and switching operation is suspended to protect the circuit.

CITATION LIST

Patent Literature

Patent Document 1: Japanese unexamined patent application publication No. H1-295671

SUMMARY

Technical Problem

Inconveniently, with the above-mentioned short circuit protection function, in applications where the input voltage varies greatly, an output short circuit may be detected erroneously. Specifically, while basically an input voltage higher than the target voltage is supplied to the switching power supply device, the input voltage can temporarily become lower than the target voltage; when this happens, in response to the drop in the output voltage resulting from the drop in the input voltage, an output short circuit may be erroneously detected to be occurring (this phenomenon will be described in detail later). Invocation of protection operation (protection operation involving suspension of switching operation) in response to erroneous detection should be prevented.

While an output short circuit has been discussed in connection with switching power supply devices, a similar discussion applies to linear power supply devices as well.

An object of the present disclosure is to provide a power supply device that can mask undesirable invocation of protection operation.

Solution to Problem

According to one aspect of the present disclosure, a power supply device includes an output transistor provided in series between an input terminal via which to receive an input voltage and an output terminal via which to deliver an output voltage, and is configured to generate the output voltage by bucking the input voltage through the control of the state of the output transistor. The power supply device includes: a short circuit protection circuit configured to perform short circuit protection operation by keeping off the output transistor based on the output voltage; and a masking circuit configured to be able to mask the short circuit protection operation based on the input voltage and the output voltage. (A first configuration.)

In the power supply device of the first configuration described above, the masking circuit may be configured to determine whether to mask the short circuit protection operation based on the difference between the input voltage and the output voltage. (A second configuration.)

In the power supply device of the second configuration described above, the masking circuit may be configured to output a predetermined masking signal when the difference between the input voltage and the output voltage is smaller than a predetermined value, and the short circuit protection circuit may be configured to inhibit the short circuit protection operation from being performed when the masking signal is being output, irrespective of the output voltage. (A third configuration.)

In the power supply device of the first configuration described above, the masking circuit is configured to determine whether to mask the short circuit protection operation based on the ratio of the output voltage to the input voltage. (A fourth configuration.)

In the power supply device of the fourth configuration described above, the masking circuit may be configured to output a predetermined masking signal when the ratio of the output voltage to the input voltage is greater than a predetermined value, and the short circuit protection circuit may be configured to inhibit the short circuit protection operation from being performed when the masking signal is being output, irrespective of the output voltage. (A fifth configuration.)

In the power supply device of any of the first to fifth configurations described above, the short circuit protection circuit may includes a short circuit detection comparator configured to compare a voltage proportional to the output voltage with a predetermined reference voltage to output a predetermined short circuit detection signal when the voltage proportional to the output voltage is lower than the reference voltage, and the short circuit protection circuit may be configured to perform the short circuit protection operation when, with the short circuit protection operation not masked, the short circuit detection signal is being output. (A sixth configuration.)

In the power supply device of any of the first to sixth configurations described above, the power supply device may be a switching power supply device configured to generate the output voltage from the input voltage by making the output transistor perform switching operation, and the power supply device may be configured to suspend the switching operation in the short circuit protection operation. (A seventh configuration.)

The power supply device of the seventh configuration described above may further include a control circuit configured to make the output transistor perform the switching operation based on a feedback voltage commensurate with the output voltage. (An eighth configuration.)

In the power supply device of any of the first to sixth configurations described above, the power supply device may be a linear power supply device. (A ninth configuration.)

The power supply device of the ninth configuration described above may further include a control circuit configured to control the potential at the control electrode of the output transistor based on a feedback voltage commensurate with the output voltage. (A tenth configuration.)

Advantageous Effects of Disclosure

According to the present disclosure, it is possible to provide a power supply device that can mask undesirable invocation of protection operation.

DESCRIPTION OF EMBODIMENTS

Figure 1:
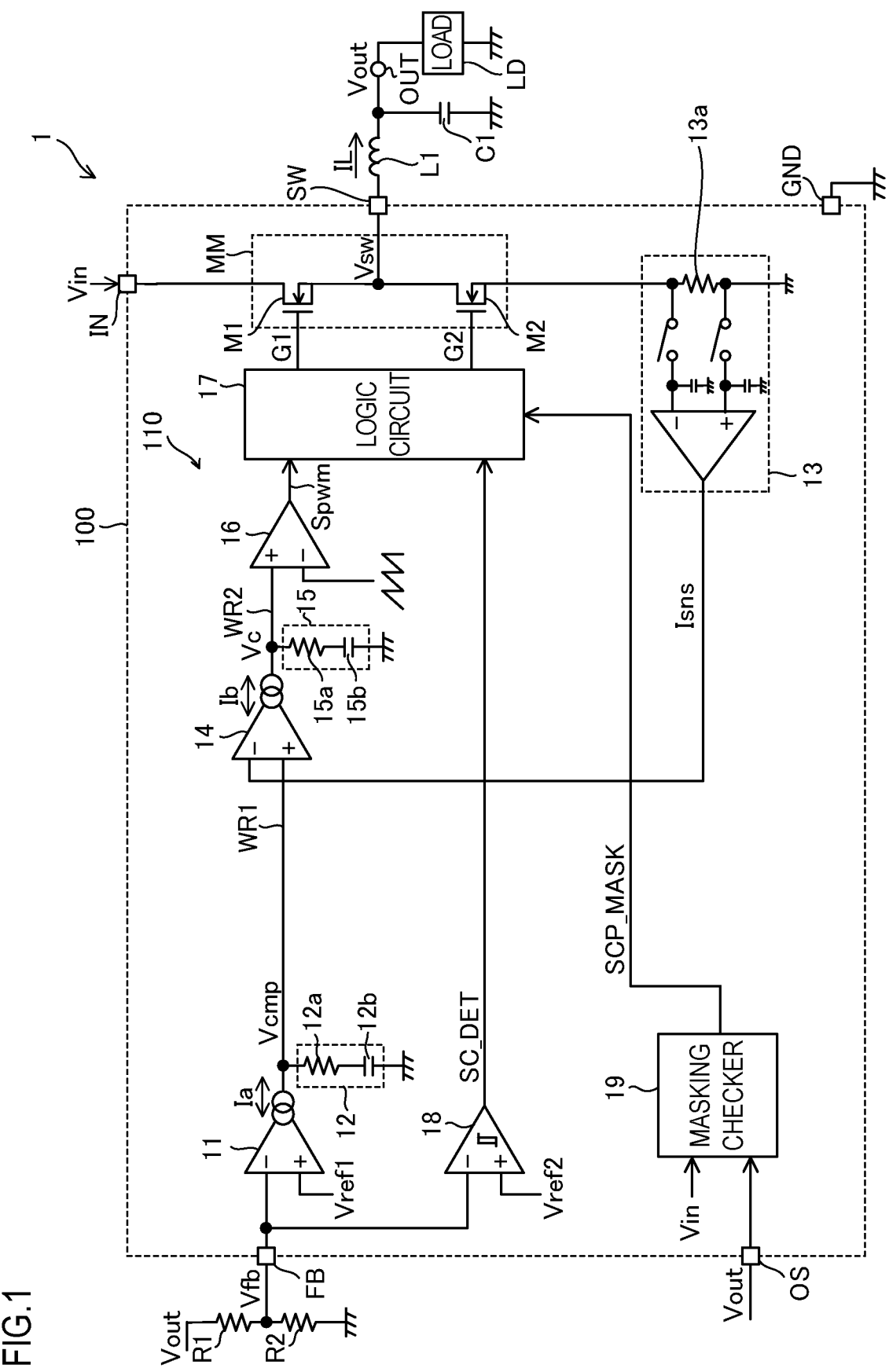
FIG. 1 is an overall configuration diagram of a switching power supply device according to a first embodiment of the present disclosure.

Hereinafter, examples of implementing the present disclosure will be described specifically with reference to the accompanying drawings. Among the different diagrams referred to in the course, the same parts are identified by the same reference signs, and in principle no overlapping description will be repeated. In the present description, for the sake of simplicity, symbols and reference signs referring to information, signals, physical quantities, elements, parts, and the like are occasionally used with omission or abbreviation of the names of the information, signals, physical quantities, elements, parts, and the like corresponding to those symbols and reference signs. For example, the switching power supply IC (see FIG. 1) described later and identified by "100" is sometimes mentioned as the switching power supply IC 100 and is other times abbreviated to the power supply IC 100 or the IC 100, all designations referring to the same entity.

First, some of the terms used to describe embodiments of the present disclosure will be defined. "IC" is an abbreviation of "integrated circuit". "Ground" refers to an electrically conductive part at a reference potential of 0 V (zero volts), or to a potential of 0 V itself. A potential of 0 V is occasionally referred to as a ground potential. In embodiments of the present disclosure, any voltage mentioned with no particular reference mentioned is a potential relative to the ground.

"Level" denotes the level of a potential, and for any signal or voltage, "high level" has a higher potential than "low level". For any signal or voltage, its being at high level means its level being equal to high level, and its being at low level means its level being equal to low level. A level of a signal is occasionally referred to as a signal level, and a level of a voltage is occasionally referred to as a voltage level.

For any signal that takes as its signal level high level or low level, the period in which the signal is at high level is referred to as the high-level period and the period in which the signal is at low level is referred to as the low-level period. The same applies to any voltage that takes as its voltage level high level or low level.

For any transistor configured as an FET (field-effect transistor), which can be a MOSFET, "on state" refers to a state where the drain-source channel of the transistor is conducting, and "off state" refers to a state where the drain-source channel of the transistor is not conducting (cut off). Similar definitions apply for any transistor that is not classified as an FET. Unless otherwise stated, any MOSFET can be understood to be an enhancement MOSFET. "MOSFET" is an abbreviation of "metal-oxide-semiconductor field-effect transistor". For any transistor, a switch from an off state to an on state is referred to as turning-on, and a switch from an on state to an off state is referred to as turning-off. In the following description, for any transistor, its being in an on or off state is often referred to simply as its being on or off respectively.

First Embodiment

A first embodiment of the present disclosure will be described. FIG. 1 is an overall configuration diagram of a switching power supply device 1 according to the first embodiment of the present disclosure. The switching power supply device 1 in FIG. 1 includes a switching power supply IC 100, which is a switching power supply circuit (switching power supply semiconductor device), and a plurality of discrete components that are externally connected to the switching power supply IC 100. These discrete components include a capacitor C1, a coil L1, and resistors R1 and R2. The switching power supply device 1 is configured as a bucking (step-down) switching power supply device (DC-DC converter) that generates a desired output voltage Vout from a desired input voltage Vin. The output voltage Vout is supplied to a load LD that is connected to an output terminal OUT. The input voltage Vin and the output voltage Vout are positive direct-current voltages, and the output voltage Vout is lower than the input voltage Vin. The output voltage Vout appears at the output terminal OUT of the switching power supply device 1. For example, the input voltage Vin is 12 V, and by adjusting the resistance values of the resistors R1 and R2, it is possible to stabilize the output voltage Vout at the desired positive voltage value (e.g., 3.3 V or 5 V) lower than 12 V.

Figures 2, 3:
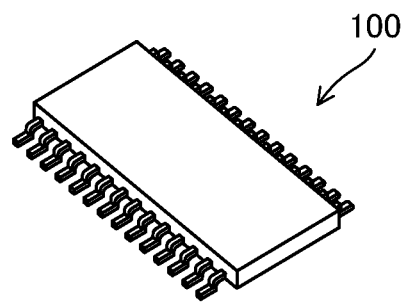
FIG. 2 is an exterior perspective view of a switching power supply IC in connection with the first embodiment of the present disclosure.
FIG. 3 is a diagram showing a relationship of the levels of a plurality of signals with the operation of an IC in connection with the first embodiment of the present disclosure.

The switching power supply IC 100 is an electronic component as shown in FIG. 2 that is produced by sealing a semiconductor integrated circuit in a package formed of resin (the same is true with the IC 200 described later; see FIG. 12). The package of the IC 100 is provided with a plurality of external terminals that are led out of it, and these external terminals include the following terminals shown in FIG. 1: an input terminal IN, a switching terminal SW, a feedback terminal FB, an output monitor terminal OS, and a ground terminal GND. The external terminals may include any other terminals than these. It should be noted that the number of external terminals of the IC 100 and the exterior appearance of the IC 100 as they are shown in FIG. 2 are merely illustrative (the same is true with the IC 200 described later).

First, the external configuration of the switching power supply IC 100 will be described. From outside the IC 100, the input voltage Vin is supplied to the input terminal IN. Between the switching terminal SW and the output terminal OUT, the coil L1 is provided in series. Specifically, one terminal of the coil L1 is connected to the switching terminal SW, and the other terminal of the coil L1 is connected to the output terminal OUT. The output terminal OUT is connected via the capacitor C1 to the ground. The output terminal OUT is also connected to one terminal of the resistor R1, and the other terminal of the resistor R1 is connected via the resistor R2 to the ground. The connection node between the resistors R1 and R2 is connected to the feedback terminal FB. The output monitor terminal OS is fed with the output voltage Vout, and the ground terminal GND is connected to the ground.

Next, the internal configuration of the switching power supply IC 100 will be described. The switching power supply IC 100 includes an output-stage circuit MM and a main control circuit 110 for controlling the state of the output-stage circuit MM.

The output-stage circuit MM includes transistors M1 and M2 that are configured as N-channel MOSFETs (metal-oxide-semiconductor field-effect transistors). The transistors M1 and M2 are a pair of switching devices that are connected in series between the input terminal IN and the ground terminal GND (i.e., the ground). As the transistors M1 and M2 are driven to perform switching, the input voltage Vin is subjected to switching, so that a switching voltage Vsw with a rectangular waveform appears at the switching terminal SW. The transistor M1 is provided on the high side, and the transistor M2 is provided on the low side. Specifically, the drain of the transistor M1 is connected to the input terminal IN, and the source of the transistor M1 and the drain of the transistor M2 are both connected to the switching terminal SW. The source of the transistor M2 may be connected directly to the ground, but it is here assumed that the source of the transistor M2 is connected via a sense resistor 13a to the ground.

The transistor M1 functions as an output transistor, and the transistor M2 functions as a synchronous rectification transistor. The coil L1 and the capacitor C1 constitute a rectifying-smoothing circuit that rectifies and smooths the switching voltage Vsw with a rectangular waveform appearing at the switching terminal SW and that thereby generates the output voltage Vout. The resistors R1 and R2 constitute a voltage division circuit that divides the output voltage Vout. The connection node between the resistors R1 and R2 is connected to the feedback terminal FB, so that the division voltage that appears at the connection node is fed as a feedback voltage Vfb to the feedback terminal FB.

The gates of the transistors M1 and M2 are fed with, as drive signals, gate signals G1 and G2 respectively, so that the transistors M1 and M2 are turned on and off in accordance with the gate signals G1 and G2. Basically the transistors M1 and M2 are turned on and off alternately, though the transistors M1 and M2 may at times be kept off simultaneously (this will be discussed in detail later).

The main control circuit 110 includes components identified by the reference signs 11 to 19.

The error amplifier 11 is a current-output transconductance amplifier. The inverting input terminal of the error amplifier 11 is fed with the voltage (i.e., the feedback voltage Vfb) fed to the feedback terminal FB, and the non-inverting input terminal of the error amplifier 11 is fed with a predetermined reference voltage Vref1. The reference voltage Vref1 here and the reference voltage Vref2 described later are direct-current voltages with different positive voltage values from each other, and are generated by a reference voltage generation circuit (not illustrated) within the IC 100. The error amplifier 11 outputs from its output terminal a current signal Ia that is commensurate with the difference between the feedback voltage Vfb and the reference voltage Vref1. The electric charge ascribable to the current signal Ia is fed into and out of a conductor (wiring) WR1. Specifically, the error amplifier 11 operates such that, when the feedback voltage Vfb is lower than the reference voltage Vref1, a current ascribable to the current signal Ia is fed from the error amplifier 11 to the conductor WR1 so that the potential on the conductor WR1 will rise and that, when the feedback voltage Vfb is higher than the reference voltage Vref1, a current ascribable to the current signal Ia is drawn from the conductor WR1 to the error amplifier 11 so that the potential on the conductor WR1 will fall. As the absolute value of the above-mentioned difference increases, the magnitude of the current ascribable to the current signal Ia increases.

A phase compensator 12 is provided between the conductor WR1 and the ground. The phase compensator 12 is fed with the current signal Ia and generates an error voltage Vcmp on the conductor WR1. The error voltage Vcmp indicates the potential on the conductor WR1. The phase compensator 12 includes a series circuit of a resistor 12a and a capacitor 12b. Specifically, one terminal of the resistor 12a is connected to the conductor WR1, and the other terminal of the resistor 12a is connected via the capacitor 12b to the ground. By adequately setting the resistance value of the resistor 12a and the capacitance value of the capacitor 12b, it is possible to compensate the phase of the error voltage Vcmp and thereby prevent oscillation of the output feedback loop.

A current sensor 13 samples the coil current IL through the coil L1 with predetermined timing and outputs a current sense signal Isns that indicates the value of the sampled coil current IL. The current sense signal Isns is a voltage signal, and accordingly the voltage indicated by the current sense signal Isns will occasionally be referred to as the voltage Isns. Here, it is assumed that the polarity of the coil current IL when it passes from the switching terminal SW to the output terminal OUT is positive and that the polarity of the coil current IL when it passes from the output terminal OUT to the switching terminal SW is negative. It is assumed that, when the polarity of the coil current IL is positive, the voltage Isns has a positive voltage value and that, when the polarity of the coil current IL is negative, the voltage Isns has a negative voltage value. The absolute value of the voltage Isns is proportional to the absolute value of the coil current IL: the absolute value of the voltage Isns increases as the absolute value of the coil current IL increases. In the switching power supply device 1 in FIG. 1, the current sensor 13 includes the sense resistor 13*a* provided between the source of the transistor M2 and the ground, and generates the voltage Isns by sampling the voltage drop across the sense resistor 13*a* during the period in which the transistor M2 is on.

The non-inverting input terminal of a differential amplifier 14 is fed with the error voltage Vcmp applied to the conductor WR1, and the inverting input terminal of the differential amplifier 14 is fed with the voltage Isns. The differential amplifier 14 outputs from its output terminal a current signal Ib that is commensurate with the difference between the error voltage Vcmp and the voltage Isns. The differential amplifier 14 too is configured as a current-output transconductance amplifier. The electric charge ascribable to the current signal Ib is fed into and out of a conductor (wiring) WR2. Specifically, the differential amplifier 14 operates such that, when the error voltage Vcmp is higher than the voltage Isns, a current ascribable to the current signal Ib is fed from the differential amplifier 14 to the conductor WR2 so that the potential on the conductor WR2 will rise and that, when the error voltage Vcmp is lower than the voltage Isns, a current ascribable to the current signal Ib is drawn from the conductor WR2 to the differential amplifier 14 so that the potential on the conductor WR2 will fall. As the absolute value of the difference between the voltages Vcmp and Isns increases, the magnitude of the current ascribable to the current signal Ib increases.

A phase compensator 15 is provided between the conductor WR2 and the ground. The phase compensator 15 is fed with the current signal Ib and generates on the conductor WR2 a comparison voltage Vc to be compared with the lamp voltage described later. The comparison voltage Vc indicates the potential on the conductor WR2. The phase compensator 15 includes a series circuit of a resistor 15*a* and a capacitor 15*b*. Specifically, one terminal of the resistor 15*a* is connected to the conductor WR2, and the other terminal of the resistor 15*a* is connected via the capacitor 15*b* to the ground. By adequately setting the resistance value of the resistor 15*a* and the capacitance value of the capacitor 15*b*, it is possible to compensate the phase of the comparison voltage Vc and thereby prevent oscillation of the output feedback loop.

The non-inverting input terminal of a PWM comparator 16 is fed with the comparison voltage Vc, and the inverting input terminal of the PWM comparator 16 is fed with a ramp voltage of which the voltage value changes periodically at a predetermined switching period. The ramp voltage is a periodic signal generated by a ramp voltage generation circuit (not illustrated) provided in the IC 100, and has, for example, a triangular or saw-tooth voltage waveform. The PWM comparator 16 compares the comparison voltage Vc with the ramp voltage and outputs a pulse width modulation signal Spwm that indicates the result of the comparison. The pulse width modulation signal Spwm is at high level during the period in which the comparison voltage Vc is higher than the ramp voltage, and is at low level during the period in which the comparison voltage Vc is lower than the ramp voltage. The on-duty of the output-stage circuit MM (i.e., the proportion of the period in which the transistor M1 is on within the above-mentioned switching period) increases as the comparison voltage Vc rises. "PWM" is an abbreviation of "pulse width modulation".

A logic circuit 17 can perform switching operation with the transistors M1 and M2 based on the pulse width modulation signal Spwm. The transistors M1 and M2 may be understood as the agent of switching operation (i.e., the transistors M1 and M2 may be understood to perform switching operation based on a signal from the logic circuit 17). In switching operation, the transistors M1 and M2 are turned on and off alternately based on the pulse width modulation signal Spwm. The error amplifier 11 generates the current signal Ia such that the feedback voltage Vfb remains equal to the reference voltage Vref1, and accordingly, through switching operation, the output voltage Vout is stabilized at a predetermined target voltage Vtg that is commensurate with the reference voltage Vref1 and the ratio of voltage division by the resistors R1 and R2.

Specifically, in switching operation, during the period in which the signal Spwm is at high level, a high-level gate signal G1 and a low-level gate signal G2 are fed to the gates of the transistors M1 and M2 respectively, so that the transistors M1 and M2 are on and off respectively. By contrast, in switching operation, during the period in which the signal Spwm is at low level, a low-level gate signal G1 and a high-level gate signal G2 are fed to the gates of the transistors M1 and M2 respectively, so that the transistors M1 and M2 are off and on respectively. Here, with the aim of reliably preventing a through current, a dead time in which the transistors M1 and M2 are both off may be inserted between the period in which the transistor M1 is on and the period in which the transistor M2 is on.

As described above, the switching power supply device 1 employs current mode control, achieving output feedback control based on both the output voltage Vout and the coil current IL. The voltage Isns commensurate with the coil current IL is fed back to the differential amplifier 14, which thus so operates that, as the error voltage Vcmp rises, the coil current IL increases and that, as the error voltage Vcmp falls, the coil current IL decreases. In this way, the magnitude of the coil current IL can be controlled in accordance with the error voltage Vcmp.

A short circuit detection comparator 18 is a comparator for detecting an output short circuit state. The short circuit detection comparator 18 compares the feedback voltage Vfb, which is fed to its inverting input terminal, and a reference voltage Vref2, which is fed to its non-inverting input terminal, and outputs a signal SC_DET that indicates the result of the comparison. The comparison here is given hysteresis. It is here assumed as follows: starting in a state where the feedback voltage Vfb is higher than the reference voltage Vref2 and the signal SC_DET is at low level, when the feedback voltage Vfb becomes lower than the reference voltage Vref2, the comparator 18 outputs a high-level signal SC_DET; thereafter, when the feedback voltage Vfb becomes higher than the voltage (Vref2+ΔHYS2), the comparator 18 switches the level of the signal SC_DET from high level to low level. The voltage (Vref2+ΔHYS2) is a voltage higher than the reference voltage Vref2 by a positive hysteresis voltage ΔHYS2.

A high-level signal SC_DET functions as a short circuit detection signal (predetermined short circuit detection signal) that indicates that an output short circuit state is being detected, while a low-level signal SC_DET does not functions as a short circuit detection signal. An output short circuit states denotes a state in which the output terminal OUT is short-circuited (this is referred to as an output short circuit) to a predetermined potential point with a potential lower than the target voltage Vtg. The predetermined potential point is typically supposed to be the ground, but may be other than the ground.

The reference voltage Vref2 for the check for an output short circuit is lower than the reference voltage Vref1 mentioned above. When the feedback voltage Vfb equals the reference voltage Vref1, the output voltage Vout equals to target voltage Vtg; thus when the output voltage Vout is lower than a predetermined short circuit detection voltage (e.g., 2V) lower than the target voltage Vtg (e.g., 5 V), the signal SC_DET is at high level. Thus, when the feedback voltage Vfb equals the reference voltage Vref2, the output voltage Vout equals the short circuit detection voltage.

A masking checker 19 generates a signal SCP_MASK based on the input voltage Vin and the output voltage Vout. The significance of the signal SCP_MASK will be clarified later.

The signals SC_DET and SCP_MASK are fed to the logic circuit 17. The above-described switching operation based on the pulse width modulation signal Spwm is permitted or inhibited depending on the levels of the signals SC_DET and SCP_MASK.

FIG. 3 shows the relationship of the signals SC_DET and SCP_MASK with the operation of the IC 100.

When the signals SC_DET and SCP_MASK are both at low level, the IC 100 performs regular operation. In regular operation, as described above, switching operation is performed based on the pulse width modulation signal Spwm. Specifically, the logic circuit 17 switches the gate signals G1 and G2 individually between high and low levels based on the pulse width modulation signal Spwm to perform switching operation with the transistors M1 and M2.

When the signal SC_DET is at high level and the signal SCP_MASK is at low level, the IC 100 performs short circuit protection operation. In short circuit protection operation, switching operation is suspended. Switching operation being suspended means the logic circuit 17 holding the gate signals G1 and G2 at low level irrespective of the pulse width modulation signal Spwm to keep the transistors M1 and M2 off. In practice, however, short circuit protection operation may be performed only when with the signal SCP_MASK kept at low level the signal SC_DET turns from low level to high level and then the signal SC_DET is kept at high level for a predetermined length of time.

A high-level signal SCP_MASK functions as a masking signal (predetermined masking signal) that indicates that short circuit protection operation should be masked, and a low-level SCP_MASK does not function as a masking signal. Accordingly, in the high-level period of the signal SCP_MASK, short circuit protection operation is masked. That is, in the high-level period of the signal SCP_MASK, irrespective of the signal SC_DET (hence irrespective of the output voltage Vout), short circuit protection operation is masked, so that, as when the signals SC_DET and SCP_MASK are both at low level, regular operation is performed. Short circuit protection operation being masked means its being inhibited from being performed.

Reference Configuration and Reference Operation

Figure 4:
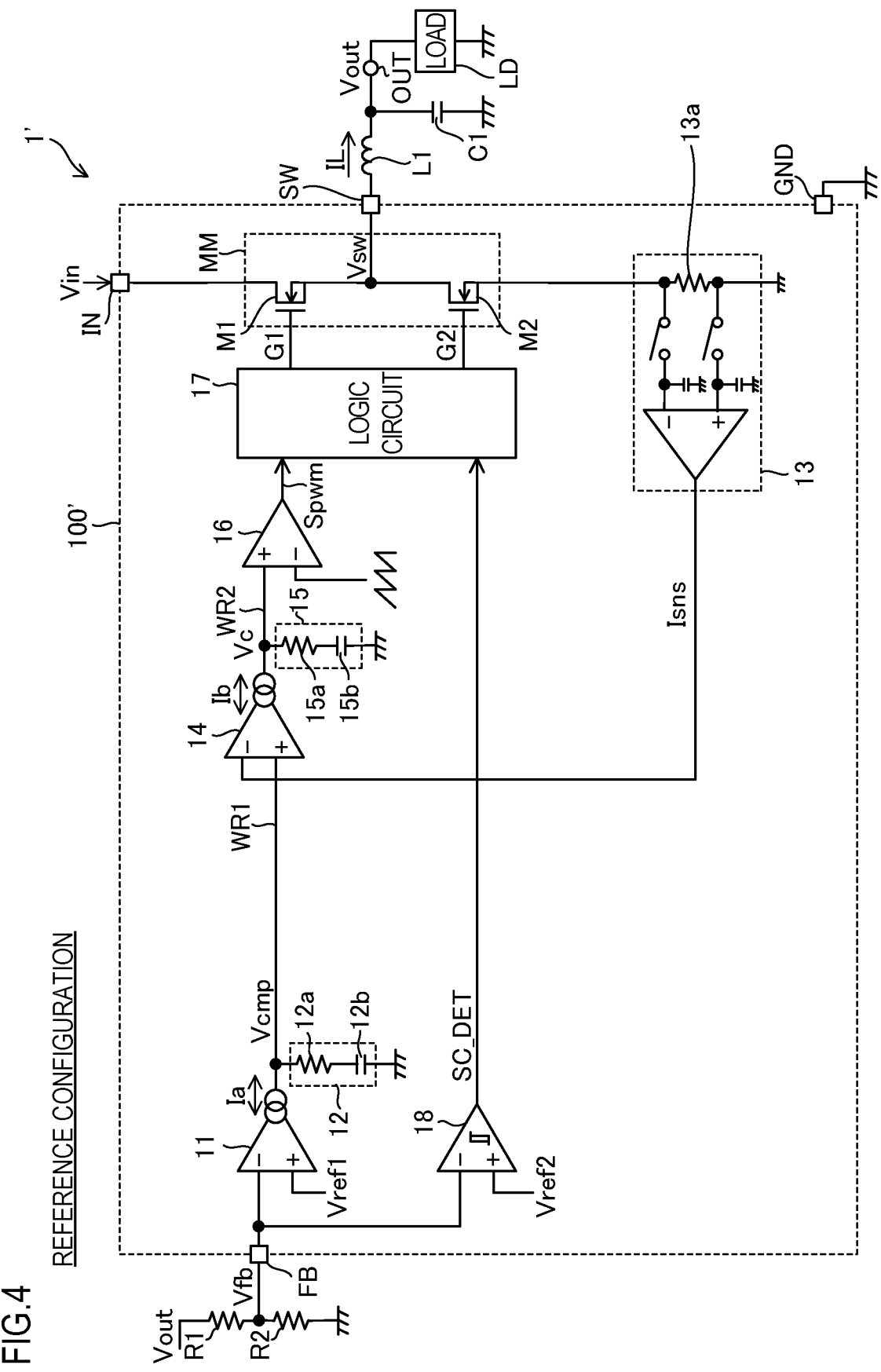
FIG. 4 is an overall configuration diagram of a reference switching power supply device.

Now, to clarify the significance of the masking checker 19, a description will be given of a reference configuration and reference operation. FIG. 4 shows a reference switching power supply device 1' according to the reference configuration. The reference switching power supply device 1' includes an IC 100' in place of the IC 100. The IC 100' in FIG. 4 is similar to the IC 100 in FIG. 1 except for the omission in the former of the masking checker 19 from the latter, and the IC 100' in FIG. 4 do not have the function of masking short circuit protection operation.

Figure 5:
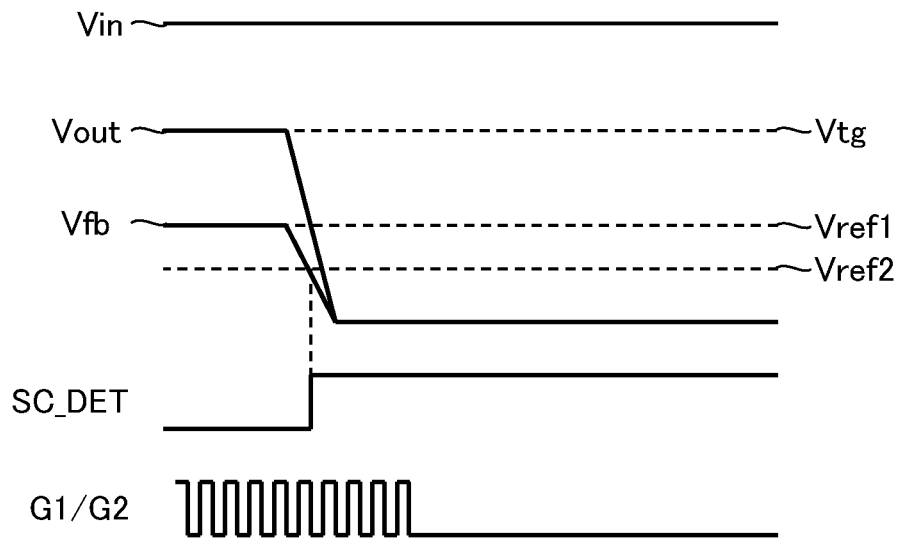
FIG. 5 is a timing chart of first reference operation.

FIG. 5 is a waveform diagram showing first reference operation of the reference switching power supply device 1'. In the first reference operation, the input voltage Vin is kept at a voltage well higher than the target voltage Vtg. In the first reference operation, the output voltage Vout is initially stabilized at the target voltage Vtg; however, at a given time point, an output short circuit occurs, with the result that the output voltage Vout rapidly falls toward 0 V and is then kept around 0 V. As the output voltage Vout falls, when the feedback voltage Vfb becomes lower than the reference voltage Vref2, the signal SC_DET turns to high level and, when the signal SC_DET is kept at high level for a predetermined length of time, short circuit protection operation accompanied by suspension of switching operation is performed.

Figure 6:
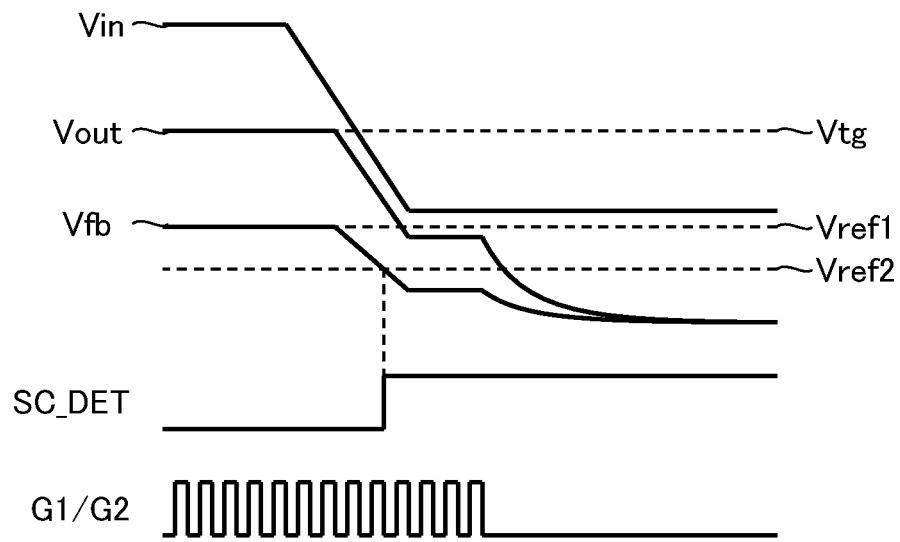
FIG. 6 is a timing chart of second reference operation.

FIG. 6 is a waveform diagram showing second reference operation of the reference switching power supply device 1'. In the second reference operation, no output short circuit occurs; instead, the input voltage Vin, which is initially well higher than the target voltage Vtg, falls, starting at a given time point, toward a voltage lower than the target voltage Vtg and is then kept at the voltage lower than the target voltage Vtg. As the input voltage Vin falls, the output voltage Vout falls, and as this proceeds, when the feedback voltage Vfb becomes lower than the reference voltage Vref2, the signal SC_DET turns to high level. When the signal SC_DET remains at high level for a predetermined length of time, short circuit protection operation accompanied by suspension of switching operation is performed.

Thus, in the second reference operation, although no output short circuit occurs in reality, one is erroneously detected to have occurred. Such erroneous detection can be avoided by setting the reference voltage Vref2 sufficiently low; however, setting the reference voltage Vref2 too low produces a state (half short-circuited state) in which the output terminal OUT is short-circuited to the ground via a low resistance component, and this prevents the feedback voltage Vfb from becoming lower than the reference voltage Vref2. Preferably, this state should be included, as a kind of output short circuit state, among the targets against which to provide protection.

Erroneous detection in the second reference operation may lead to fatal malfunctioning in the entire system including the switching power supply device. Such erroneous detection is particularly problematic in applications where the input voltage Vin varies comparatively greatly (e.g., applications in which the output voltage of a battery on a vehicle is used as the input voltage Vin).

Configurations and other features of the masking checker 19 that help prevent erroneous detection as mentioned above will now be described by way of some practical examples. A first embodiment includes practical examples EX1_1 to EX1_4 described below. Any of the features described above in connection with the first embodiment (except for the reference configuration and the first and second reference operations) is, unless otherwise stated or unless inconsistent, applicable to any of practical examples EX1_1 to EX1_4 described below. In a given practical example, for any feature inconsistent with one described previously in connection with the first embodiment, the description of that feature given in connection with the given practical example can prevail. Unless inconsistent, any of the features of any one of practical examples EX1_1 to EX1_4 is applicable to any other of them (i.e., any two or more of different practical examples can be implemented in combination).

Practical Example EX1_1

Figure 7:
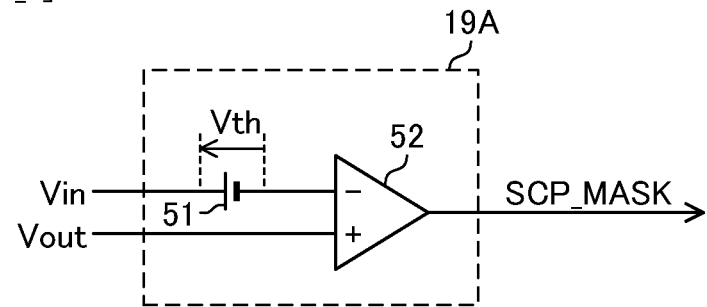
FIG. 7 is a configuration diagram of a masking checker in connection with practical example EX1_1 belonging to the first embodiment of the present disclosure.

Practical example EX1_1 will be described. In practical example EX1_1, the masking checker 19 generates the signal SCP_MASK based on the difference between the input voltage Vin and the output voltage Vout. FIG. 7 shows a masking checker 19A according to practical example EX1_1. The masking checker 19A can be used as the masking checker 19 in FIG. 1.

The masking checker 19A includes a voltage source 51, which generates a predetermined positive direct-current voltage as a threshold voltage Vth, and a comparator 52. With the voltage source 51 inserted between an application terminal for the input voltage Vin (i.e., the terminal to which the input voltage Vin is applied) and the inverting input terminal of the comparator 52, the inverting input terminal of the comparator 52 is fed with a voltage (Vin−Vth). The voltage (Vin−Vth) is a voltage lower than the input voltage Vin by the threshold voltage Vth. The non-inverting input terminal of the comparator 52 is fed with the output voltage Vout.

Thus, the comparator 52 outputs a low-level signal SCP_MASK when the voltage (Vin−Vth) is higher than the output voltage Vout, and outputs a high-level signal SCP_MASK when the voltage (Vin−Vth) is lower than the output voltage Vout. That is, when the voltage difference (Vin−Vout) between the input voltage Vin and the output voltage Vout is smaller than the threshold voltage Vth, the signal SCP_MASK is at high level. When the voltage (Vin−Vth) equals the output voltage Vout, the signal SCP_MASK is at low or high level.

The circuit configuration shown in FIG. 7 is merely illustrative; the masking checker 19A may have any specific configuration so long as it can keep the signal SCP_MASK at high level when the voltage difference (Vin−Vout) is smaller than the threshold voltage Vth. For example, the voltage source 51 may be inserted at the non-inverting input terminal side of the comparator 52 (in which case the voltage source 51 has to be inserted in the opposite direction). The comparator 52 may be given hysteresis.

Figure 8:
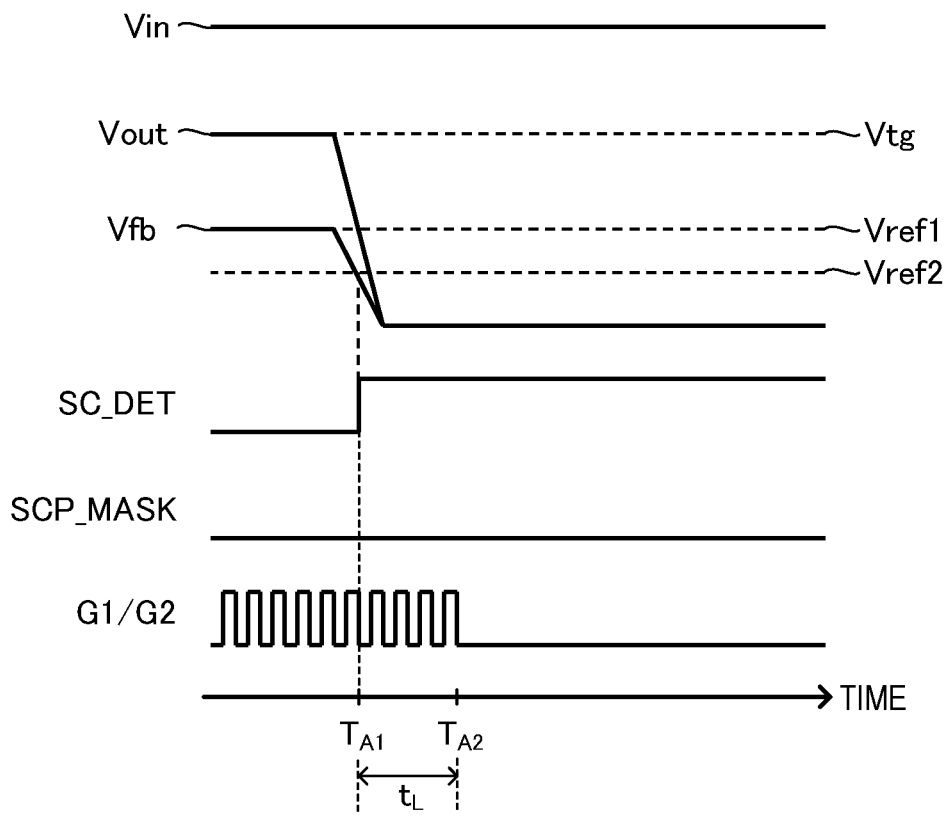
FIG. 8 is a timing chart of a first operation example in connection with practical example EX1_1 belonging to the first embodiment of the present disclosure.

With reference to FIG. 8, a description will be given of a first operation example in which regular short circuit protection operation is performed. In the first operation example, the input voltage Vin is kept at a voltage well higher than the target voltage Vtg. In the first operation example, the output voltage Vout is initially stabilized at the target voltage Vtg; however, at a given time point, an output short circuit occurs, with the result that the output voltage Vout rapidly falls toward 0 V and is then kept around 0 V. As the output voltage Vout falls, when at time point $T_{A1}$ the feedback voltage Vfb becomes lower than the reference voltage Vref2, the signal SC_DET turns from low level to high level.

After the signal SC_DET turns from low level to high level, when the signal SC_DET is kept at high level for a predetermined length of time $t_L$ throughout, the logic circuit 17 performs short circuit protection operation accompanied by suspension of switching operation. In the first operation example, the signal SC_DET is kept at high level from time point $T_{A1}$ to the predetermined length of time $t_L$ thereafter, that is, to time point $T_{A2}$, and then further from time point $T_{A2}$ on. Thus, the switching operation that has been performed continuously up to time point $T_{A2}$ is suspended by short circuit protection operation at time point $T_{A2}$. If, after time point $T_{A1}$, the signal SC_DET turns back to low level before time point $T_{A2}$ occurs, short circuit protection operation is not performed.

Figure 9:
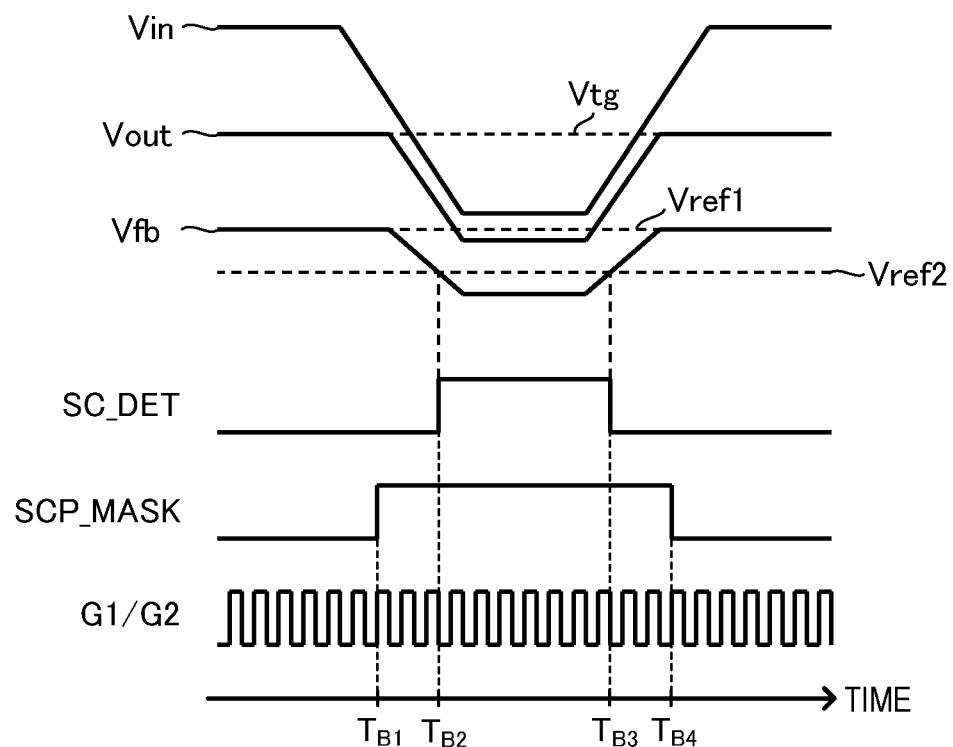
FIG. 9 is a timing chart of a second operation example in connection with practical example EX1_1 belonging to the first embodiment of the present disclosure.

With reference to FIG. 9, a description will be given of a second operation example, which is an operation example where the input voltage Vin falls but no output short circuit occurs. In the second operation example, the input voltage Vin, which is initially higher than the target voltage Vtg, falls, starting at a given time point, toward a voltage lower than the target voltage Vtg and is then kept at the voltage lower than the target voltage Vtg for a while, after which the input voltage Vin rises toward a voltage higher than the target voltage Vtg and eventually returns to the voltage higher than the target voltage Vtg.

In the second operation example, while the input voltage Vin is in the process of falling, the output voltage Vout, which has been stabilized at the target voltage Vtg, becomes close to the input voltage Vin; thus, at time point $T_{B1}$, the signal SCP_MASK turns from low level to high level and thereafter, at time point $T_{B2}$, the feedback voltage Vfb becomes lower than the reference voltage Vref2, with the result that the signal SC_DET turns from low level to high level.

After that, when the input voltage Vin starts to rise from the voltage lower than the target voltage Vtg, the output voltage Vout and the feedback voltage Vfb also start to rise; when, at time point $T_{B3}$, the feedback voltage Vfb becomes higher than the reference voltage Vref2, the signal SC_DET turns from high level to low level. Further later, while the input voltage Vin is in the process of rising, as the different between the input voltage Vin and the output voltage Vout increases, at time point $T_{B4}$ the signal SCP_MASK turns from high level to low level.

As described above, in the second operation example, during the period between time points $T_{B1}$ and $T_{B4}$, which belongs to the period in which the input voltage Vin is lower than in the steady state, the signal SCP_MASK is at high level, and during the high-level period of the signal SCP_MASK (in the period between time points $T_{B1}$ and $T_{B4}$), short circuit protection operation is masked. Thus, even though the signal SC_DET is at high level between time points $T_{B2}$ and $T_{B3}$, short circuit protection operation is not performed. In the second operation example, switching operation is performed continuously without being suspended.

Figure 10:
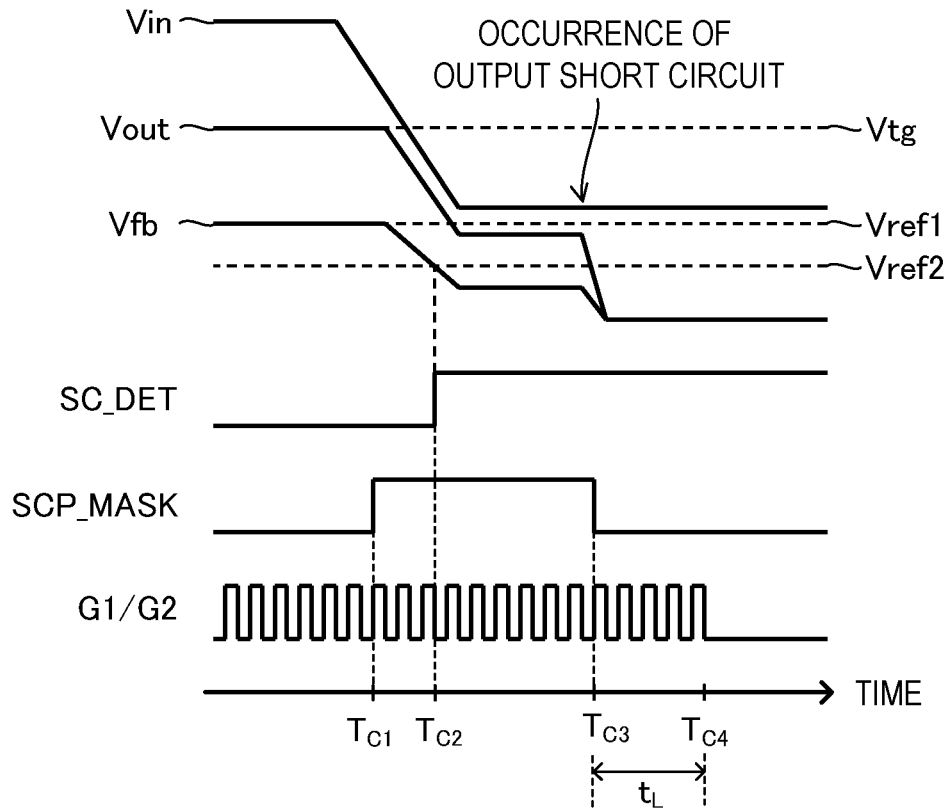
FIG. 10 is a timing chart of a third operation example in connection with practical example EX1_1 belonging to the first embodiment of the present disclosure.

With reference to FIG. 10, a third operation example will be described. In the third operation example, the input voltage Vin, which is initially higher than the target voltage Vtg, falls, starting at a given time point, toward a voltage lower than the target voltage Vtg and, while the input voltage Vin is kept at the voltage lower than the target voltage Vtg, an output short circuit occurs.

In the third operation example, while the input voltage Vin is in the process of falling, the output voltage Vout, which has been stabilized at the target voltage Vtg, becomes close to the input voltage Vin; thus, at time point $T_{C1}$, the signal SCP_MASK turns from low level to high level and thereafter, at time point $T_{C2}$, the feedback voltage Vfb becomes lower than the reference voltage Vref2, with the result that the signal SC_DET turns from low level to high level. After that, while the input voltage Vin is kept at a voltage lower than the target voltage Vtg, an output short circuit occurs; thus the output voltage Vout rapidly falls toward 0 V and is then kept around 0 V. A drop in the output voltage Vout resulting from an output short circuit augments the difference between the input voltage Vin and the output voltage Vout and, based on the augmented difference, the signal SCP_MASK turns from high level to low level at time point $T_{C3}$.

In the third operation example, during the high-level period of the signal SCP_MASK (the period between $T_{C1}$ and $T_{C3}$), short circuit protection operation is masked. Thus, even though the signal SC_DET is at high level between time points $T_{C2}$ and $T_{C3}$, short circuit protection operation is not performed, and switching operation is performed continuously without being suspended.

After time point $T_{C3}$, at which the signal SCP_MASK turns from high level to low level, when the signal SC_DET is kept at high level for the predetermined length of time $t_L$ throughout, the logic circuit 17 performs short circuit protection operation accompanied by suspension of switching operation. In the third operation example, after time point $T_{C2}$, the signal SC_DET is kept at high level throughout. Thus, the switching operation that has been performed continuously up to time point $T_{C4}$ is suspended by short circuit protection operation at time point $T_{C4}$. Time point $T_{C4}$ occurs the predetermined length of time $t_L$ after time point $T_{C3}$.

As will be understood from the second operation example in FIG. 9, with the switching power supply device 1, owing to the use of the signal SCP_MASK, it is possible to effectively prevent erroneous detection of an output short circuit as observed in the second reference operation in FIG. 6.

According to one reference scheme worth consideration, only the input voltage Vin is monitored and, when the input voltage Vin is low (for example, when it is lower than a reference voltage lower than the target voltage Vtg), short circuit protection operation is masked. Inconveniently, with this reference scheme, when the input voltage Vin falls so low that short circuit protection operation is masked, even if an output short circuit really occurs, switching operation cannot be suspended. That is, if the reference scheme is applied to the situation of the operation example in FIG. 10, even if, around time point $T_{C3}$, an output short circuit occurs, the low input voltage Vin keeps short circuit protection operation masked and this prevents invocation of the desired short circuit protection. By contrast, the scheme according to the embodiment under discussion, which judges whether to mask short circuit protection operation based on both the input voltage Vin and the output voltage Vout, is free from the just mentioned inconvenience, and allows effective short circuit protection in cases like the one in FIG. 10.

Practical Example EX1_2

Figure 11:
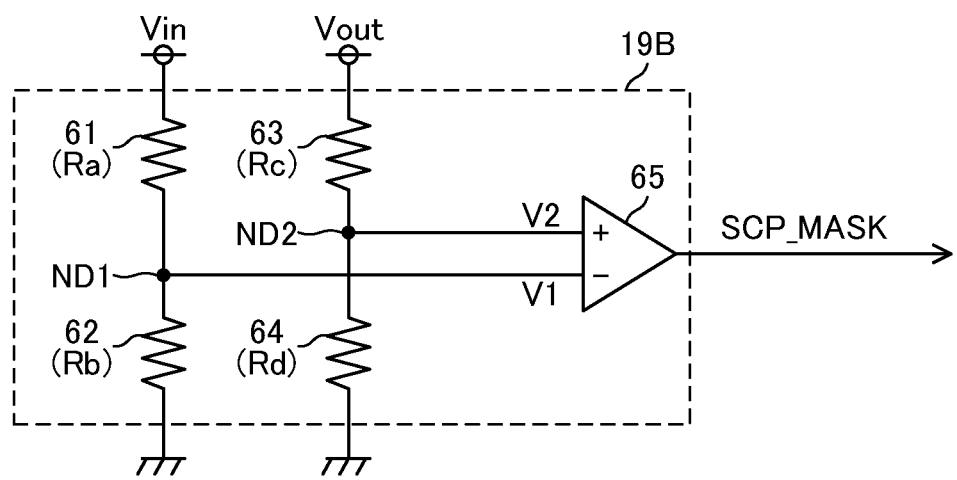
FIG. 11 is a configuration diagram of a masking checker in connection with practical example EX1_2 belonging to the first embodiment of the present disclosure.

Practical example EX1_2 will be described. In practical example EX1_2, the masking checker 19 generates the signal SCP_MASK based on the ratio of the output voltage Vout to the input voltage Vin. FIG. 11 shows a masking checker 19B according to practical example EX1_2. The masking checker 19B can be used as the masking checker 19 in FIG. 1.

The masking checker 19B includes resistors 61 to 64 and a comparator 65. One terminal of the resistor 61 is connected to an application terminal for the input voltage Vin (i.e., the terminal to which the input voltage Vin is applied), and the other terminal of the resistor 61 is connected via the resistor 62 to the ground. One terminal of the resistor 63 is connected to an application terminal for the output voltage Vout (i.e., the terminal to which the output voltage Vout is applied), and the other terminal of the resistor 63 is connected via the resistor 64 to the ground. The inverting input terminal of the comparator 65 is connected to the connection node ND1 between the resistors 61 and 62. The non-inverting input terminal of the comparator 65 is connected to the connection node ND2 between the resistors 63 and 64.

The voltage that appears at the connection node ND1 between the resistors 61 and 62 will be represented by the reference sign "V1", and the voltage that appears at the connection node ND2 between the resistors 63 and 64 will be represented by the reference sign "V2". The comparator 65 keeps the signal SCP_MASK at low level when "V1>V2", and keeps the signal SCP_MASK at high level when "V2>V1". When "V1=V2", the signal SCP_MASK is at high or low level.

Here, let the resistance values of the resistors 61, 62, 63, and 64 be Ra, Rb, Rc, and Rd respectively; then the voltages V1 and V2 are given by the following equations:

$$V1 = Vin \times Rb/(Ra+Rb)$$

$$V2 = Vout \times Rd/(Rc+Rd)$$

Thus, fulfilling "V2>V1" is equivalent to fulfilling "Vout/Vin>VALth", and the threshold value VALth here is given by "VALth=Rb(Rc+Rd)/Rd (Ra+Rb)". That is, the masking checker 19B keeps the signal SCP_MASK at high level when the ratio (Vout/Vin) of the output voltage Vout to the input voltage Vin is greater than the predetermined threshold value VALth. The threshold value VALth is a predetermined positive value (e.g., 0.9) less than but close to one.

A condition that fulfills "Vout/Vin>VALth" corresponds to a condition where the difference between the input voltage Vin and the output voltage Vout is small. Thus practical example EX1_2 provides workings and benefits similar to those that practical example EX1_1 provides.

Practical Example EX1_3

Practical example EX1_3 will be described. Short circuit protection operation is masked also during the start-up of the switching power supply device 1. That is, in the switching power supply device 1, when as a result of the input voltage Vin starting to be supplied to the IC 100 the IC 100 starts up, the output-stage circuit MM starts to perform switching operation; after the start of switching operation until a predetermined start-up masking period elapses, irrespective of the output of the masking checker 19, short circuit protection operation is masked. The masking of short circuit protection operation that is achieved with the masking checker 19 is masking that is performed after the lapse of the start-up masking period.

Practical Example EX1_4

Practical example EX1_4 will be described. While, with reference to FIG. 1, a switching power supply device 1 that controls the switching operation of transistors M1 and M2 in current mode has been described, a switching power supply device according to the present disclosure may be controlled and configured in any other manner so long as it can generate an output voltage Vout from a input voltage Vin by switching operation based on a feedback voltage Vfb commensurate with the output voltage Vout.

For example, a switching power supply device may be configured to control the switching operation of transistors M1 and M2 in voltage mode. In a switching power supply device that operates in voltage mode, the coil current IL is not referred to, and instead the comparison voltage Vc is generated such that the feedback voltage Vfb remains equal to the reference voltage Vref1 (once the comparison voltage Vc is generated, the operation thereafter is the same as described above). Instead, a switching power supply device may employ diode rectification (in that case the transistor M2 is replaced with a diode).

Now, a study will be given on a switching power supply device WA according to one aspect of the present disclosure that is implemented with the switching power supply device described above.

The switching power supply device WA includes an output transistor (M1) provided in series between an input terminal (IN) via which to receive an input voltage (Vin) and an output terminal (OUT) via which to deliver an output voltage (Vout), and generates the output voltage by bucking the input voltage through the control of the state of the output transistor (through switching control of the output transistor). The switching power supply device WA includes a short circuit protection circuit that performs short circuit protection operation by keeping the output transistor off based on the output voltage and a masking circuit that can mask short circuit protection operation (i.e., inhibits short circuit protection operation from being performed) based on the input voltage and the output voltage.

In the switching power supply device WA, the masking circuit determines whether to mask short circuit protection operation based on the difference between the input voltage and the output voltage or based on the ratio of the output voltage to the input voltage, and outputs a predetermined masking signal (in the example described above, a high-level signal SCP_MASK) when the difference or the ratio fulfills a predetermined condition. When the masking signal is being output, irrespective of the output voltage (in the example described above, irrespective of the level of the signal SC_DET), the short circuit protection circuit inhibits short circuit protection operation from being performed.

In the switching power supply device 1 (FIG. 1) as a specific example of the switching power supply device WA, the short circuit protection circuit includes among its components a short circuit detection comparator 18, and the masking circuit includes among its components a masking checker 19. Here, considering that short circuit protection operation is achieved by coordinated operation of the short circuit detection comparator 18 and the logic circuit 17, the short circuit protection circuit may be understood to include the logic circuit 17. Likewise, considering that the masking of short circuit protection operation is achieved by coordinated operation of the masking checker 19 and the logic circuit 17, the masking circuit may be understood to include the logic circuit 17.

The switching power supply device WA also includes a control circuit that makes the output transistor perform switching operation based on the feedback voltage (Vfb) commensurate with the output voltage.

The control circuit corresponds to the main control circuit 110 in the configuration in FIG. 1 (or may be understood to include the components identified by the reference signs 11 to 17).

In the switching power supply device WA, the short circuit protection circuit includes a short circuit detection comparator (18) that compares a voltage proportional to the output voltage with a predetermined reference voltage (Vref2) to output a predetermined short circuit detection signal (in the example described above, a high-level signal SC_DET) when the voltage proportional to the output voltage is lower than the reference voltage. The short circuit protection circuit performs short circuit protection operation when, with short circuit protection operation not masked, the short circuit detection signal is being output.

The voltage that is compared with the predetermined reference voltage (Vref2) in the short circuit protection circuit is the feedback voltage (Vfb) in the configuration in FIG. 1, but may instead be any voltage that is proportional to the output voltage or may be the output voltage itself.

Second Embodiment

A second embodiment of the present disclosure will be described. The second embodiment, and also the third embodiment described later, is an embodiment based on the first embodiment. For any feature that is not specifically described in connection with the second and third embodiments, unless inconsistent, the description of the corresponding feature in the first embodiment applies to the second and third embodiments. In interpreting the second embodiment, for any part of its description which contradicts that of the first embodiment, the description given in connection with the second embodiment can prevail (the same is true with the third embodiment described later). Unless inconsistent, any two or more of the first to third embodiments can be implemented in combination.

The present disclosure is applicable also to a linear power supply device (series power supply device). As the second embodiment, a configuration example of a linear power supply device to which the present disclosure is applied will be described.

Figures 12, 13:
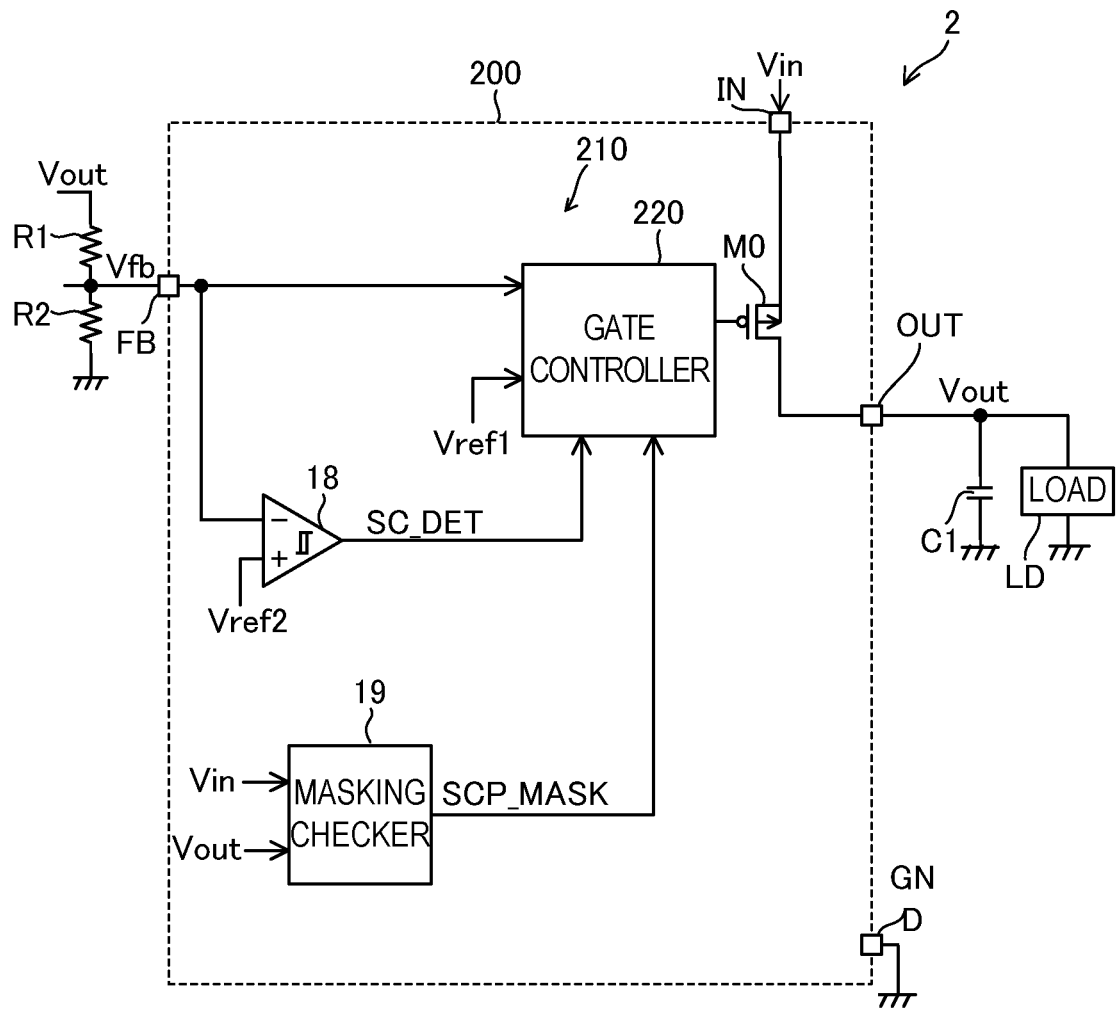
FIG. 12 is an overall configuration diagram of a linear power supply device according to a second embodiment of the present disclosure.
FIG. 13 is a diagram showing a relationship of the levels of a plurality of signals with the operation of an IC in connection with the second embodiment of the present disclosure.

FIG. 12 is an overall configuration diagram of the linear power supply device 2 according to the second embodiment of the present disclosure. The linear power supply device 2 in FIG. 12 includes a linear power supply IC 200, which is a linear power supply circuit (linear power supply semiconductor device), and a plurality of discrete components that are externally connected to the linear power supply IC 200. These discrete components include a capacitor C1 and resistors R1 and R2. The linear power supply device 2 generates an output voltage Vout by bucking (stepping down) an input voltage Vin. The output voltage Vout is supplied to a load LD that is connected to an output terminal OUT. The input voltage Vin and the output voltage Vout are positive direct-current voltages, and the output voltage Vout is lower than the input voltage Vin. The output voltage Vout appears at the output terminal OUT of the linear power supply device 2. For example, the input voltage Vin is 12 V, and by adjusting the resistance values of the resistors R1 and R2, it is possible to stabilize the output voltage Vout at the desired positive voltage value (e.g., 3.3 V or 5 V) lower than 12 V.

Like the switching power supply IC 100 in FIG. 1, the linear power supply IC 200 includes, as external terminals, an input terminal IN, a feedback terminal FB, a ground terminal GND. The linear power supply IC 200 includes, as an external terminal, an output terminal OUT.

From outside the IC 200, the input voltage Vin is supplied to the input terminal IN. The ground terminal GND is connected to the ground. The output terminal OUT is connected via the capacitor C1 to the ground. The output terminal OUT is also connected to one terminal of the resistor R1, and the other terminal of the resistor R1 is connected via the resistor R2 to the ground. The connection node between the resistors R1 and R2 is connected to the feedback terminal FB.

The linear power supply IC 200 includes an output transistor M0 and a main control circuit 210 for controlling the state of the output transistor M0. In the configuration example in FIG. 12, the output transistor M0 is configured as a P-channel MOSFET. The source of the output transistor M0 is connected to the input terminal IN, and the drain of the output transistor M0 is connected to the output terminal OUT. The resistors R1 and R2 constitute a voltage division circuit that divides the output voltage Vout. The connection node between the resistors R1 and R2 is connected to the feedback terminal FB, so that the division voltage that appears at the connection node is fed as a feedback voltage Vfb to the feedback terminal FB.

The main control circuit 210 includes a gate controller 220, a short circuit detection comparator 18, and a masking checker 19. The gate controller 220 is connected to the feedback terminal FB, and continuously controls the gate potential of the output transistor M0 such that the feedback voltage Vfb remains equal to a predetermined reference voltage Vref1. Here the output transistor M0 operates in the saturation region, and the current through the output transistor M0 is controlled continuously. As a result, the output voltage Vout is stabilized at a target voltage Vtg that is determined by the reference voltage Vref1 and the ratio of the resistance values of the resistors R1 and R2.

The short circuit detection comparator 18 in the IC 200 is the same as its counterpart in the IC 100. The reference voltage Vref1 and a reference voltage Vref2, which is referred to by the short circuit detection comparator 18, are direct-current voltages with different positive voltage values from each other, and are generated by a reference voltage generation circuit (not illustrated) within the IC 200. What has been described of the reference voltages Vref1 and Vref2 in connection with the first embodiment applies equally to the second embodiment.

The masking checker 19 in the IC 200 is the same as its counterpart in the IC 100. As the masking checker 19 in the IC 200, the masking checker 19A or 19B described previously can be employed (see FIGS. 7 and 11).

In the IC 200, a signal SC_DET from the short circuit detection comparator 18 and a signal SCP_MASK from the masking checker 19 are fed to the gate controller 220.

FIG. 13 shows the relationship of the signals SC_DET and SCP_MASK with the operation of the IC 200.

When the signals SC_DET and SCP_MASK are both at low level, the IC 200 performs regular operation. In regular operation, as described above, the gate potential of the output transistor M0 is controlled continuously such that the feedback voltage Vfb remains equal to the predetermined reference voltage Vref1. Specifically, feedback control is performed in regular operation such that, when "Vfb<Vref1", the gate potential of the output transistor M0 is lowered and, when "Vfb>Vref1", the gate potential of the output transistor M0 is raised.

When the signal SC_DET is at high level and the signal SCP_MASK is at low level, the IC 200 performs short circuit protection operation. In short circuit protection operation, irrespective of the feedback voltage Vfb, the output transistor M0 is kept off. In practice, however, short circuit protection operation may be performed only when with the signal SCP_MASK kept at low level the signal SC_DET turns from low level to high level and then the signal SC_DET is kept at high level for a predetermined length of time.

A high-level signal SCP_MASK functions as a masking signal (predetermined masking signal) that indicates that short circuit protection operation should be masked, and a low-level SCP_MASK does not function as a masking signal. Accordingly, in the high-level period of the signal SCP_MASK, short circuit protection operation is masked. That is, during the high-level period of the signal SCP_MASK, irrespective of the signal SC_DET (hence irrespective of the output voltage Vout), short circuit protection operation is masked, so that, as when the signals SC_DET and SCP_MASK are both at low level, regular operation is performed. Short circuit protection operation being masked means it being inhibited from being performed.

Short circuit protection operation is masked also during the start-up of the linear power supply device 2. That is, in the linear power supply device 2, when as a result of the input voltage Vin starting to be supplied to the IC 200 the IC 200 starts up, the gate potential of the output transistor M0 starts to be controlled based on the feedback voltage Vfb; after the start of gate potential control until a predetermined start-up masking period elapses, irrespective of the output of the masking checker 19, short circuit protection operation is masked. The masking of short circuit protection operation that is achieved with the masking checker 19 is masking that is performed after the lapse of the start-up masking period.

Here, a study will be given on a linear power supply device WB according to one aspect of the present disclosure that is implemented with the linear power supply device described above.

The linear power supply device WB includes an output transistor (M0) provided in series between an input terminal (IN) via which to receive an input voltage (Vin) and an output terminal (OUT) via which to deliver an output voltage (Vout), and generates the output voltage by bucking the input voltage through the control of the state of the output transistor. The linear power supply device WB includes a short circuit protection circuit that performs short circuit protection operation by keeping the output transistor off based on the output voltage and a masking circuit that masks short circuit protection operation (i.e., inhibits short circuit protection operation from being performed) based on the input voltage and the output voltage.

In the linear power supply device WB, the masking circuit determines whether to mask short circuit protection operation based on the difference between the input voltage and the output voltage or based on the ratio of the output voltage to the input voltage, and outputs a predetermined masking signal (in the example described above, a high-level signal SCP_MASK) when the difference or the ratio fulfills a predetermined condition. When the masking signal is being output, irrespective of the output voltage (in the example described above, irrespective of the level of the signal SC_DET), the short circuit protection circuit inhibits short circuit protection operation from being performed.

In the linear power supply device 2 (FIG. 12) as a specific example of the linear power supply device WB, the short circuit protection circuit includes among its components a short circuit detection comparator 18, and the masking circuit includes among its components a masking checker 19. Here, considering that short circuit protection operation is achieved by coordinated operation of the short circuit detection comparator 18 and the gate controller 220, the short circuit protection circuit may be understood to include the gate controller 220. Likewise, considering that the masking of short circuit protection operation is achieved by coordinated operation of the masking checker 19 and the gate controller 220, the masking circuit may be understood to include the gate controller 220.

The linear power supply device WB also includes a control circuit that controls the gate potential of the output transistor based on the feedback voltage (Vfb) commensurate with the output voltage.

The control circuit corresponds to the main control circuit 210 in the configuration in FIG. 12 (or may be understood to include only the gate controller 220).

In the linear power supply device WB, the short circuit protection circuit includes a short circuit detection comparator (18) that compares a voltage proportional to the output voltage with a predetermined reference voltage (Vref2) to output a predetermined short circuit detection signal (in the example described above, a high-level signal SC_DET) when the voltage proportional to the output voltage is lower than the reference voltage. The short circuit protection circuit performs short circuit protection operation when, with short circuit protection operation not masked, the short circuit detection signal is being output.

The voltage that is compared with the reference voltage (Vref2) in the short circuit protection circuit is the feedback voltage (Vfb) in the configuration in FIG. 12, but may instead be any voltage that is proportional to the output voltage or may be the output voltage itself.

Third Embodiment

A third embodiment of the present disclosure will be described. As the third embodiment, features that can be implemented in combination with the first or second embodiment, or modified features that can be applied to the first and second embodiments, will be described. The third embodiment includes practical examples EX3_1 to EX3_3 described below, of which any two or more can be combined together.

Practical Example EX3_1

Figure 14A:
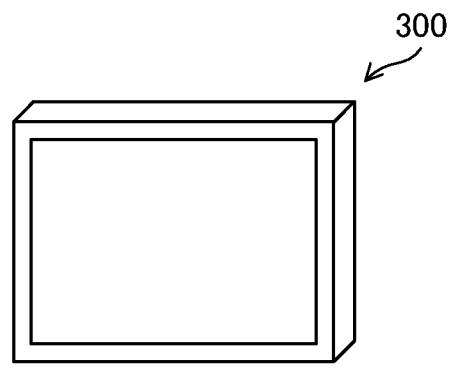
FIGS. 14A and 14B are an exterior view and an outline configuration block diagram, respectively, of a car navigation device according to a third embodiment of the present disclosure.
Figure 14B:
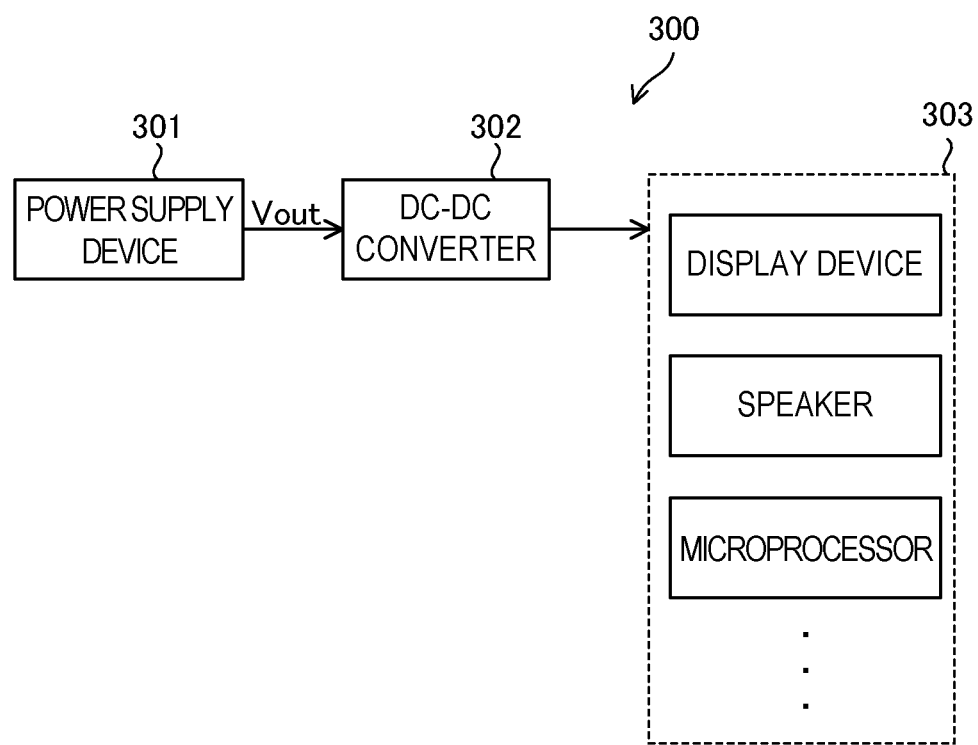

Practical example EX3_1 will be described. FIG. 14A is an exterior view of a car navigation device 300 according to practical example EX3_1, and FIG. 14B is an outline configuration block diagram of the car navigation device 300. The car navigation device 300 includes a power supply device 301, a DC-DC converter 302, and a functional block 303. As the power supply device 301, the power supply device 1 or 2 described above can be used. The input voltage Vin for the power supply device 301 can be supplied from a battery mounted on a vehicle that is furnished with the car navigation device 300. The DC-DC converter 302 converts the output voltage Vout of the power supply device 301 into at least one direct-current voltage with a desired voltage value, and feeds the obtained direct-current voltage to the functional block 303. The functional block 303 operates on the direct-current voltage supplied from the DC-DC converter 302. The functional block 303 includes a plurality of components that perform various functions of the car navigation device 300, and include a display device, a speaker, a microprocessor, and the like. The output voltage of the power supply device 301 may be supplied directly to the functional block 303.

In the car navigation device 300, the DC-DC converter 302 and the functional block 303 may be understood to be the load LD for the power supply device 301. Needless to say, the power supply device 1 or 2 may be incorporated not only in a car navigation device but in any other appliance that includes any load LD.

Practical Example EX3_2

Practical example EX3_2 will be described. In the ICs 100 and 200, the output voltage Vout may be fed directly to the feedback terminal FB, in which case the feedback voltage Vfb is the output voltage Vout itself. Even when the feedback voltage Vfb is the output voltage Vout itself, the feedback voltage Vfb is as ever a feedback voltage that is commensurate with the output voltage Vout.

Practical Example EX3_3

Practical example EX3_3 will be described.

The circuit elements of the ICs 100 and 200 are formed as semiconductor integrated circuits, and these semiconductor integrated circuits are sealed in a package made of resin to produce a semiconductor device. Instead, a plurality of discrete components may be used to form circuits equivalent to the circuits in the ICs 100 and 200. Some of the circuit elements described above as being included in the IC 100 or 200 (e.g., the transistors M1 and M2 in the configuration in FIG. 1, or the transistor M0 in the configuration in FIG. 12) may be provided outside the IC 100 or 200 and be externally connected it.

For any signal or voltage, the relationship between its high and low levels may be inverted so long as that can be done with no essential deviation from what has been described above.

The transistor M1 in FIG. 1 may be configured as a P-channel MOSFET, in which case, to perform the switching operation described above, the voltage level that is fed to the gate of the transistor M1 is modified from what is described above. Likewise, the transistor M0 in FIG. 12 may be configured as an N-channel MOSFET. In general, the channel type of any FET may be modified as desired.

Any of the transistors mentioned above may be of any type. For example, any of the transistors mentioned above as a MOSFET may be replaced with a junction FET, an IGBT (insulated-gate bipolar transistor), or a bipolar transistor. Any transistor has a first electrode, a second electrode, and a control electrode. In an FET, of the first and second electrodes one is the drain and the other is the source, and the control electrode is the gate. In an IGBT, of the first and second electrodes one is the collector and the other is the emitter, and the control electrode is the gate. In a bipolar transistor that is not classified as an IGBT, of the first and second electrodes one is the collector and the other is the emitter, and the control electrode is the base.

Embodiments of the present disclosure can be modified in many ways as necessary without departure from the scope of the technical concepts defined in the appended claims. The embodiments described herein are merely examples of how the present disclosure can be implemented, and what is meant by any of the terms used to describe the present disclosure and its constituent elements is not limited to that mentioned in connection with the embodiments. The specific values mentioned in the above description are merely illustrative and needless to say can be modified to different values.

REFERENCE SIGNS LIST 1 switching power supply device
18 short circuit detection comparator
19 masking checker
100 switching power supply IC
110 main control circuit
M1 output transistor
2 linear power supply device
200 linear power supply IC
210 main control circuit
M0 output transistor

The invention claimed is:

1. A power supply device including an output transistor provided in series between an input terminal via which to receive an input voltage and an output terminal via which to deliver an output voltage, the power supply device being configured to generate the output voltage by bucking the input voltage through control of a state of the output transistor, the power supply device comprising:

a short circuit protection circuit configured to perform short circuit protection operation by keeping off the output transistor based on the output voltage; and a masking circuit configured to be able to mask the short circuit protection operation based on the input voltage and the output voltage.

2. The power supply device according to claim 1, wherein the masking circuit is configured to determine whether to mask the short circuit protection operation based on a difference between the input voltage and the output voltage.

3. The power supply device according to claim 2, wherein the masking circuit is configured to output a predetermined masking signal when the difference between the input voltage and the output voltage is smaller than a predetermined value, and the short circuit protection circuit is configured to inhibit the short circuit protection operation from being performed when the masking signal is being output, irrespective of the output voltage.

4. The power supply device according to claim 1, wherein the masking circuit is configured to determine whether to mask the short circuit protection operation based on a ratio of the output voltage to the input voltage.

5. The power supply device according to claim 4, wherein the masking circuit is configured to output a predetermined masking signal when the ratio of the output voltage to the input voltage is greater than a predetermined value, and the short circuit protection circuit is configured to inhibit the short circuit protection operation from being performed when the masking signal is being output, irrespective of the output voltage.

6. The power supply device according to claim 1, wherein the short circuit protection circuit includes a short circuit detection comparator configured to compare a voltage proportional to the output voltage with a predetermined reference voltage to output a predetermined short circuit detection signal when the voltage proportional to the output voltage is lower than the reference voltage, and the short circuit protection circuit is configured to perform the short circuit protection operation when, with the short circuit protection operation not masked, the short circuit detection signal is being output.

7. The power supply device according to claim 1, wherein the power supply device is a switching power supply device configured to generate the output voltage from the input voltage by making the output transistor perform switching operation, and the power supply device is configured to suspend the switching operation in the short circuit protection operation.

8. The power supply device according to claim 7, further comprising a control circuit configured to make the output transistor perform the switching operation based on a feedback voltage commensurate with the output voltage.

9. The power supply device according to claim 1, wherein the power supply device is a linear power supply device.

10. The power supply device according to claim 9, further comprising a control circuit configured to control a potential at a control electrode of the output transistor based on a feedback voltage commensurate with the output voltage.

* * * * *